(12) United States Patent
Fujii et al.

(10) Patent No.: US 12,343,779 B2
(45) Date of Patent: Jul. 1, 2025

(54) TRIMMING DEVICE

(71) Applicant: FUJI SPRINGS CO., INC., Asago (JP)

(72) Inventors: Akira Fujii, Asago (JP); Toshihiro Odagaki, Asago (JP)

(73) Assignee: FUJI SPRINGS CO., INC., Asago (JP)

( * ) Notice: Subject to any disclaimer, the term of this patent is extended or adjusted under 35 U.S.C. 154(b) by 0 days.

(21) Appl. No.: 18/864,259

(22) PCT Filed: Feb. 9, 2024

(86) PCT No.: PCT/JP2024/004561
§ 371 (c)(1),
(2) Date: Nov. 8, 2024

(87) PCT Pub. No.: WO2024/190216
PCT Pub. Date: Sep. 19, 2024

(65) Prior Publication Data
US 2025/0108426 A1    Apr. 3, 2025

(30) Foreign Application Priority Data
Mar. 16, 2023 (JP) .................... 2023-042015

(51) Int. Cl.
*B21D 28/28*    (2006.01)
(52) U.S. Cl.
CPC .................... *B21D 28/28* (2013.01)
(58) Field of Classification Search
CPC ...... B23D 31/001; B23D 21/02; B23D 21/14; B26F 1/14; B29C 49/72; B21D 51/2615;
(Continued)

(56) References Cited

U.S. PATENT DOCUMENTS 2,397,048 A * 3/1943 Roop .................. B23D 21/14
83/191
3,955,453 A * 5/1976 Carmichael ............ B23D 21/14
83/198

(Continued)

FOREIGN PATENT DOCUMENTS

DE    19805093 A1    8/1998
JP    49137024 U    3/1973

(Continued)

OTHER PUBLICATIONS

WIPO, International Search Report issued on Apr. 2, 2024 for PCT application No. PCT/JP2024/004561.

(Continued)

*Primary Examiner* — Ghassem Alie
(74) *Attorney, Agent, or Firm* — Li & Cai Intellectual Property (USA) Office (57) ABSTRACT

To provide a trimming device with which it is possible to suppress the deterioration of shape quality after trimming a cylindrical workpiece. When trimming is performed by means of a core metal cutting edge (33*f*) and a tool cutting edge (31*f*) upon moving at least one of a core metal punch (33) and a trimming tool (31A), gaps (H1, H2) are formed between the core metal punch (33) and a workpiece (W). Damper mechanisms (100A, 100B) are arranged in the gaps (H1, H2). The damper mechanisms (100A, 100B) are arranged so as to abut on the workpiece (W) when trimming is performed by the core metal cutting edge (33*f*) and the (Continued)

tool cutting edge (31*f*), and are constituted so as to elastically deform when a force acts in a direction in which the trimming tool (31A) moves forward and backward.

4 Claims, 8 Drawing Sheets

(58) Field of Classification Search
CPC .... B21D 51/2646; B21D 22/30; B21D 51/26; B21D 51/38; B21D 51/2638; Y02E 60/10; Y10T 83/0596; Y10T 83/40; Y10T 83/398; Y10T 83/9384; Y10T 83/05; Y10T 83/9391
USPC ............... 83/184, 192, 41, 54, 34, 668, 371
See application file for complete search history.

(56) References Cited

U.S. PATENT DOCUMENTS

| | | | |
|---|---|---|---|
| 4,986,154 A * | 1/1991 | Vernacchio | B23D 21/14 83/191 |
| 6,347,900 B1 | 2/2002 | Sadakata et al. | |
| 2003/0051588 A1 * | 3/2003 | Rice | B23D 21/02 83/917 |
| 2004/0226421 A1 * | 11/2004 | Kelley | B23D 21/02 83/668 |
| 2015/0224668 A1 | 8/2015 | Tanaka et al. | |

FOREIGN PATENT DOCUMENTS

| | | | | |
|---|---|---|---|---|
| JP | 61164710 A | | 7/1986 | |
| JP | 63212024 A | | 9/1988 | |
| JP | 2002292438 A | | 10/2002 | |
| JP | 2012157959 A | * | 8/2012 | ............ Y02E 60/10 |
| JP | 201446313 A | | 3/2014 | |
| JP | 201719079 A | | 1/2017 | |

OTHER PUBLICATIONS

Japan Patnent Office, Decision to Grant a Patent issued on Oct. 24, 2023 regarding Japanese patent application No. 2023-042015.
German Patent Office, Office Action issued on Nov. 27, 2024 for DE application No. 112024000046.0.

\* cited by examiner

TRIMMING DEVICE

FIELD OF THE DISCLOSURE

The present invention relates to a trimming device configured to cut an opening edge of a cylindrical workpiece.

BACKGROUND OF THE DISCLOSURE

Generally, in a trimming device of the type described above, inner and outer fitting parts are fitted with inner and outer sides of a cylindrical workpiece, respectively, and a bottom wall of the cylindrical workpiece is sandwiched between inner and outer sides. In this state, the outer fitting part is slid against the inner fitting part. As a result, an inner cutting edge of the inner fitting part and an outer cutting edge of the outer fitting part cut an opening edge of the cylindrical workpiece (see, e.g., Patent Document 1).

PRIOR ART DOCUMENTS

Patent Documents

Patent Document 1: Japanese Patent Application Publication No. 2002-292438.

Problems to be Solved

However, in the conventional trimming device described above, when cutting the opening edge of the cylindrical workpiece, the bottom portion of the cylindrical workpiece may slide and this movement may cause the cylindrical workpiece to tilt, which may impair the shape quality of the cylindrical workpiece after trimming. There is a risk of a decrease in shape quality at the cut surface. Additionally, the cylindrical workpiece is cut at the opening edge sequentially on each side. If the cylindrical workpiece tilts when cutting the opening edge of the cylindrical workpiece, the height of the cut portion may differ on each side, causing a step.

SUMMARY OF THE DISCLOSURE

The present invention has been made in view of the above-described technical problems, and an object thereof is to provide a trimming device capable of suppressing a decrease in shape quality of a cylindrical workpiece after trimming.

Means for Solving Problems

A first aspect of the present invention is a trimming device comprising:
 a first trimming member including a first cutting edge and a body portion, the first trimming member being movable in a first direction and disposable inside a cylindrical workpiece;
 a second trimming member including a second cutting edge, and being disposed such that a side portion of the cylindrical workpiece is between the first cutting edge and the second cutting edge; and
 a moving mechanism configured to move at least one of the first trimming member or the second trimming member in a second direction orthogonal to the first direction, wherein
 the trimming device moves at least one of the first trimming member or the second trimming member in the second direction to trim another end portion of the cylindrical workpiece with the first cutting edge and the second cutting edge,
 the trimming device is configured such that:
 in the state where the first trimming member is disposed inside the cylindrical workpiece, a first gap is created between the first cutting edge and the cylindrical workpiece; and
 when the at least one of the first trimming member or the second trimming member is moved in the second direction and the first cutting edge and the second cutting edge trim the other end portion of the cylindrical workpiece, a second gap is created between the body portion and the cylindrical workpiece, and
 the trimming device further includes a guide member disposed in the second gap, the guide member being configured to:
 suppress tilting of the cylindrical workpiece when the other end portion of the cylindrical workpiece is at least trimmed by the first cutting edge and the second cutting edge by being disposed in the second gap in contact with the cylindrical workpiece; and
 elastically deform when subject to a force in the second direction.

According to the above-described first aspect of the trimming device, a first gap is created between the first cutting edge and the cylindrical workpiece in a state where the first trimming member is disposed inside the cylindrical workpiece. Additionally, the guide member is disposed in contact with the cylindrical workpiece in the second gap created between the body portion and the cylindrical workpiece when the other end portion of the cylindrical workpiece is trimmed by the first cutting edge and the second cutting edge. The guide member is configured to elastically deform when subject to a force in the second direction. Thus, when the other end portion of the cylindrical workpiece is trimmed, tilting of the cylindrical workpiece can be suppressed without interfering with the first cutting edge and the second edge trimming the other end portion of the cylindrical workpiece, and a decrease in shape quality of the cylindrical workpiece after trimming can be suppressed.

A second aspect of the present invention is the trimming device in the above-described first aspect, wherein the guide member is preferably provided at least at a first position and a second position at a predetermined interval in the first direction.

A third aspect of the present invention is the trimming device in the above-described first aspect, wherein the guide member may be provided extending in the first direction.

A fourth aspect of the present invention may be a transfer press comprising the trimming device according to any one of the first to third aspects.

Advantageous Effects of the Invention

According to the present invention, it is possible to provide a trimming device capable of suppressing a decrease in shape quality of a cylindrical workpiece after trimming.

DETAILED DESCRIPTION OF THE EXEMPLARY EMBODIMENTS

Figure 1:
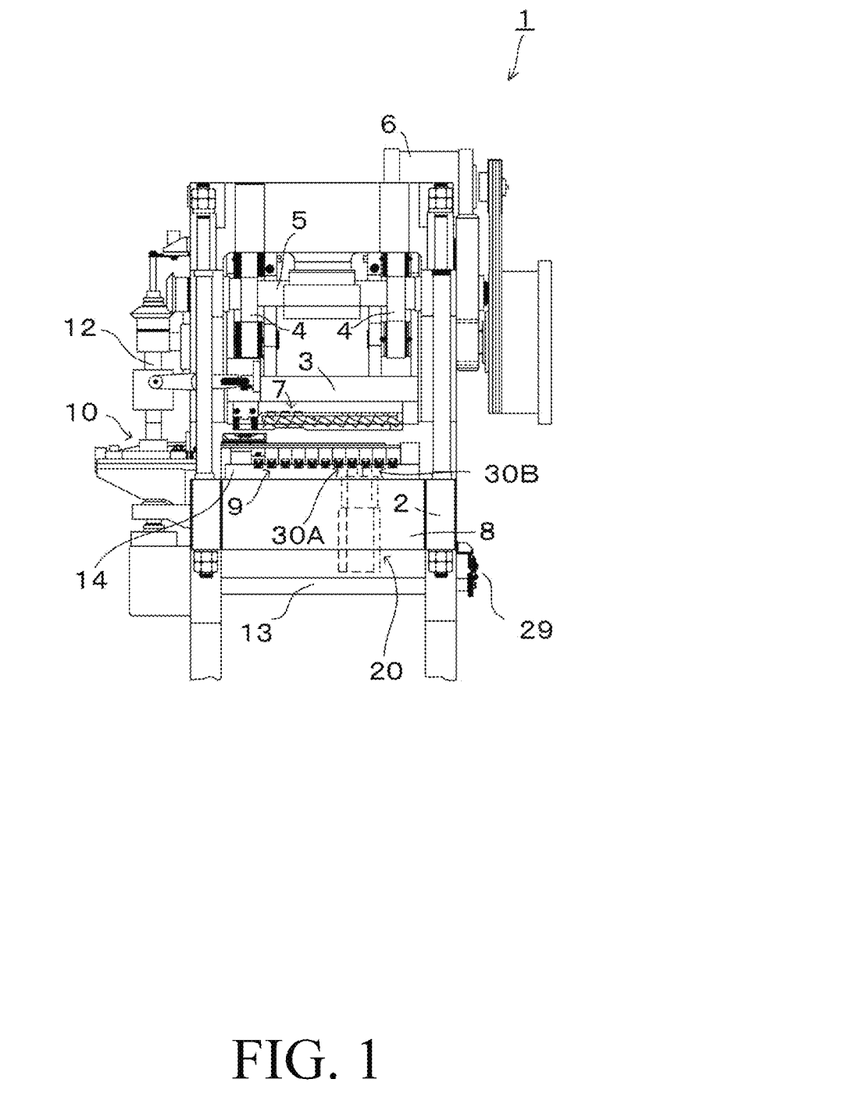
FIG. 1 is a front view showing an example of a transfer press used for trimming a workpiece.
Figure 2:
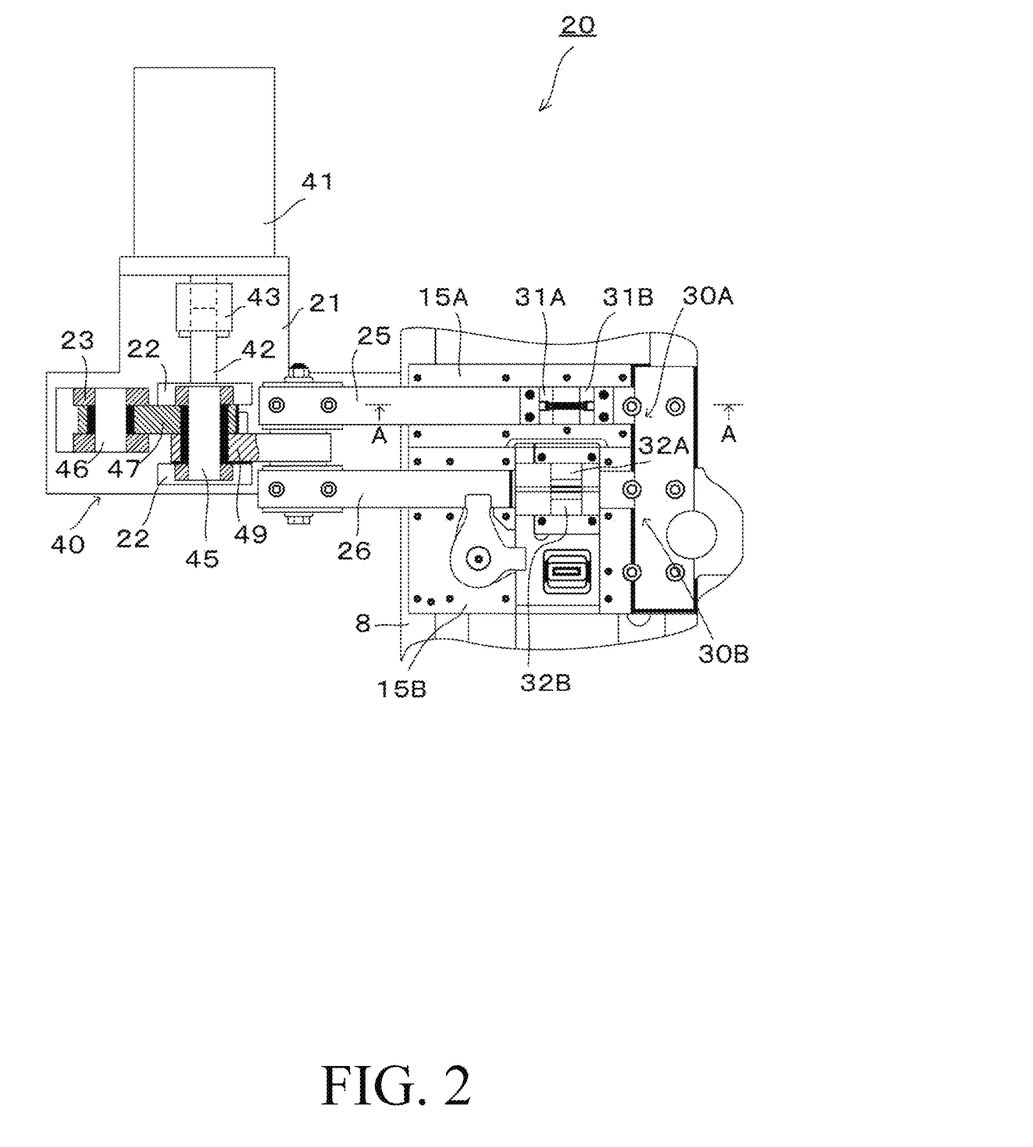
FIG. 2 is a view showing an example of a trimming device according to an embodiment of the present invention, and is a plan view as viewed from a top end face of an actuation rod.
Figure 3:
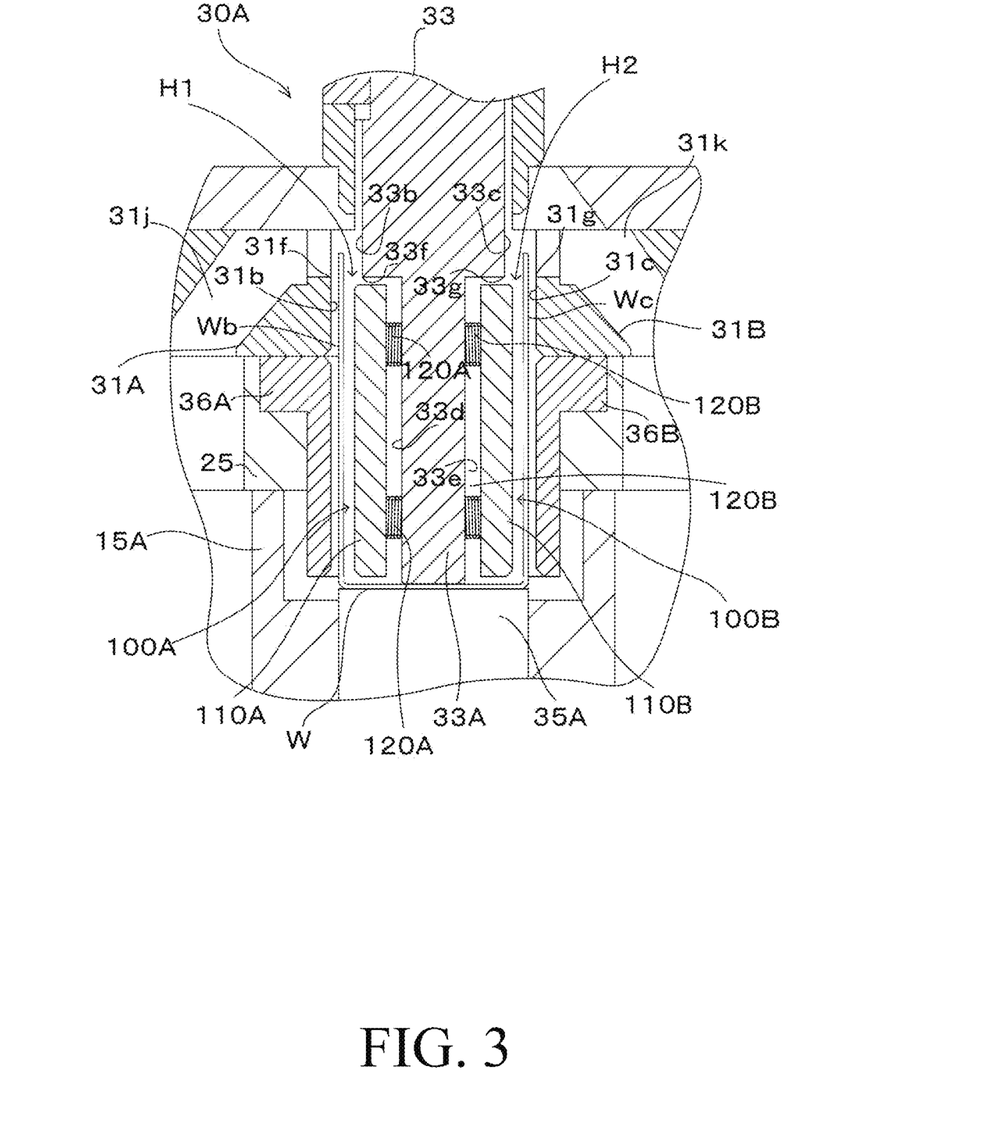
FIG. 3 is an explanatory view of an example of a trimming processing portion to be trimmed in a transfer direction, and is a cross-sectional view taken along line A-A in FIG. 2.
Figure 4:
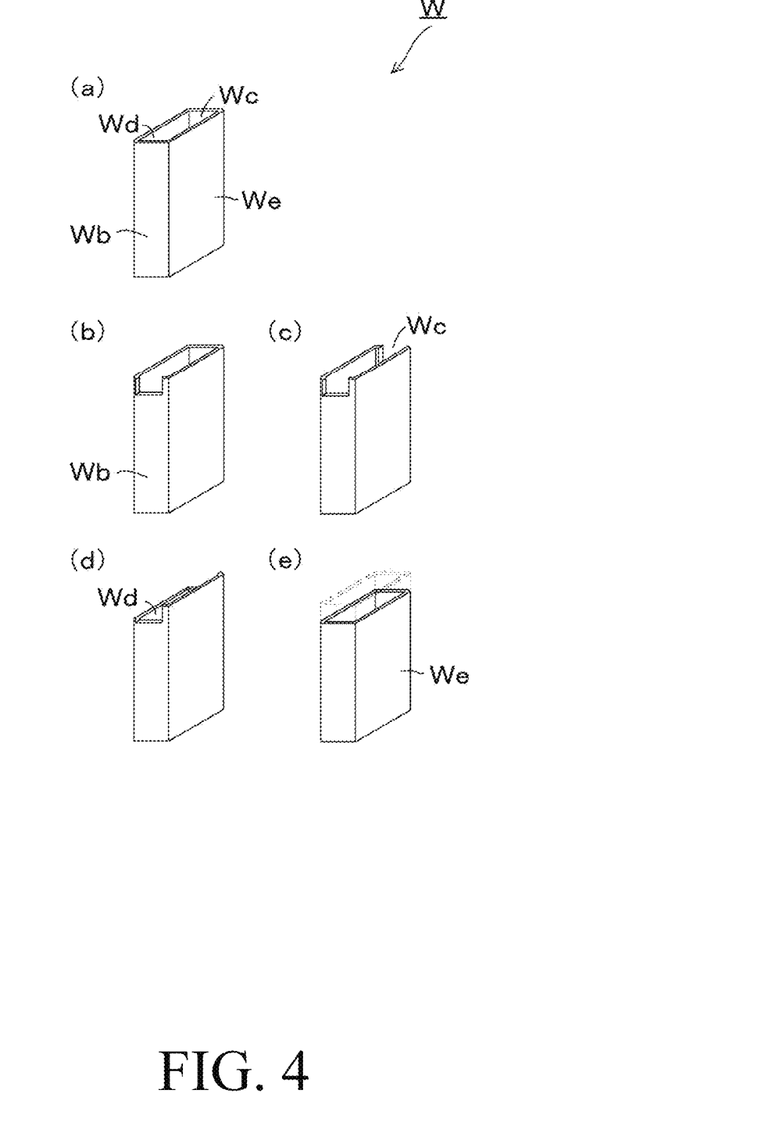
FIG. 4 is an explanatory view of an example of processing shapes of a workpiece, in which: (a) is a view showing the shape before trimming; (b) is a view showing a state where one side face in a transfer orthogonal direction has been trimmed; (c) is a view showing a state where another side face in the transfer orthogonal direction has been trimmed; (d) is a view showing a state where a rear side face in the transfer direction has been trimmed; and (e) is a view showing a state where a front side face in the transfer direction has been trimmed.

Hereinafter, embodiments of the present invention will be described with reference to FIGS. 1 to 4. FIG. 1 is a front view showing an example of a transfer press used for trimming a workpiece. FIG. 2 is a view showing an example of a trimming device according to an embodiment of the present invention, and is a plan view as viewed from a top end face of an actuation rod. FIG. 3 is an explanatory view of an example of a trimming processing portion to be trimmed in a transfer direction, and is a cross-sectional view taken along line A-A in FIG. 2. FIG. 4 is an explanatory view of an example of processing shapes of a workpiece, in which: (a) is a view showing the shape before trimming; (b) is a view showing a state where one side face in a transfer orthogonal direction has been trimmed; (c) is a view showing a state where another side face in the transfer orthogonal direction has been trimmed; (d) is a view showing a state where a rear side face in the transfer direction has been trimmed; and (e) is a view showing a state where a front side face in the transfer direction has been trimmed.

Note that, herein, the direction from the left side of the paper to the right side of the paper in FIG. 1 is the transfer direction, and a direction horizontally orthogonal to the transfer direction (direction orthogonal to the paper in FIG. 1) is the transfer orthogonal direction. Note that, while FIG. 3 shows an example of trimming in the transfer direction (i.e., an example in which the long side of a workpiece W is trimmed), the workpiece is also trimmed in the transfer orthogonal direction (i.e., the short side of the workpiece W is also trimmed). The same applies to FIGS. 5 to 8 below.
(Trimming Device)
A transfer press 1 shown in FIG. 1 includes a frame 2. On an upper half portion of the frame 2, there are provided a slide 3 capable of moving up and down, gate cams 4, 4 configured to move the slide 3 up and down, a drive rotor shaft 5 that fixes the gate cams 4, 4 and is supported rotatably by the gate cams 4, 4, and a motor 6 configured to drive the drive rotor shaft 5. The slide 3 moves reciprocally up and down by being rotationally driven by the motor 6. An upper die set 7 is fixed to a lower end portion of the slide 3. The upper die set 7 is mounted with a plurality of drawing punches (not shown) for drawing.

On a lower half portion of the frame 2, there are provided a bolster 8, a lower base 14 fixed on the bolster 8, a lower die set 9 fixed to the lower base 14 and mounted with a plurality of drawing dies (not shown) to perform drawing in tandem with the plurality of drawing punches that move up and down, a transfer bar (not shown) configured to move reciprocally in a left-right direction in FIG. 1 at an upper face portion of the lower die set 9, fingers (not shown) configured to grip a workpiece at different positions corresponding to different processing steps along the transfer bar and transfer the workpiece to a downstream process, and a transfer drive mechanism 10 configured to drive the fingers and the transfer bar.

The transfer drive mechanism 10 is driven by an intermediate shaft 12 that rotates synchronously with the drive rotor shaft 5. An auxiliary drive shaft 13 is linked to the intermediate shaft 12 in a manner that allows synchronous rotation, and a resolver 29 is provided near a shaft end portion of the auxiliary drive shaft 13. The resolver 29 detects a rotational angle position of the auxiliary drive shaft 13 and outputs a start signal for a servomotor 41 of a toggle mechanism 40. The upstream processing of the transfer press 1 includes a first punching and drawing process to form a square cylindrical workpiece W shown in FIG. 4(*a*), and several subsequent drawing processes are provided at equal intervals starting from the left side of the figure. The downstream processing of the transfer press 1 includes a trimming process performed at a processing position 30A in which an opening at short side cylindrical walls Wb and Wc of the workpiece W is cut (hereinafter called "trimmed"), and a trimming process performed at a processing position 30B in which an opening at long side cylindrical walls Wd and We of the workpiece W is trimmed.

Note that, the workpiece W is a bottomed cylindrical workpiece with a bottom at one end (the end at the bottom of the paper in FIG. 4) and an opening at the other end (the end at the top of the paper in FIG. 4).

A trimming device 20 is incorporated near the processing positions 30A and 30B for the trimming process. As shown in FIG. 2, the trimming device 20 includes the toggle mechanism 40 on a support stand 21 fixed to a side face of the bolster 8. The toggle mechanism 40 causes an actuation rod 25 and an actuation rod 26 to advance and retreat on an operating axis orthogonal to a transfer axis of the workpiece W. The actuation rod 25 is provided on an upstream die holder 15A. The actuation rod 26 is provided on a downstream die holder 15B. The phrase "operating axis orthogonal to a transfer axis of the workpiece W" refers to a direction horizontally orthogonal to the transfer direction of the workpiece W. The "toggle mechanism 40" corresponds to the "moving mechanism" of the present invention. However, it goes without saying that the "moving mechanism" of the present invention is not limited to the "toggle mechanism 40" and may be, for example, an automatic machine that directly operates tool stands 36A, 36B or a core punch (see FIG. 3 for both) described below by an actuator.

After the square cylindrical workpiece W is transferred from the upstream drawing process to the processing position 30A for the trimming process, trimming tools 31A and 31B described below are moved back and forth against the workpiece W by way of the actuation rod 25 advancing and retreating to trim the opening at the short side cylindrical walls Wb and Wc shown in FIG. 4(a). Then, the square cylindrical workpiece W is transferred from the processing position 30A for the trimming process to the processing position 30B for the downstream trimming process, and the trimming tools 31A and 31B trim the opening at the long side cylindrical walls Wd and We by way of the actuating rod 26 advancing and retreating. The direction in which the trimming tools 31A and 31B advance and retreat (left-right direction on the paper in FIG. 2) corresponds to the "second direction" of the present invention. For example, the transfer direction and the transfer orthogonal direction each correspond to the "second direction".

The "trimming tool 31A" and the "trimming tool 31B" correspond to the "second trimming member" of the present invention. A "core punch 33" described below corresponds to the "first trimming member" of the present invention.

Next, as shown in FIG. 2, the toggle mechanism 40, which causes the actuating rods 25 and 26 to advance and retreat, includes a servomotor 41 installed on the support stand 21, and a crankshaft 42. The crankshaft 42 is rotationally driven by the servomotor 41 via a coupling 43 and is supported by bearing base plates 22, 22 on the support stand 21. One end of a connecting rod (not shown) is supported on an eccentric shaft portion of the crankshaft 42 in a manner that allows relative rotation, an oscillation shaft 45 is attached to the other end of the connecting rod, and an oscillation base shaft 46 is attached to a bearing foot plate 23 on the support stand 21.

An oscillating link 47 is supported by the oscillation base shaft 46 and the oscillation shaft 45 in a manner pivotable about the oscillation base shaft 46. A bearing plate (not shown) is fixed to a rear end portion of each of the actuation rods 25 and 26. The actuation rods 25 and 26 are linked by a linear-motion shaft (not shown), which is inserted and tightened to the corresponding bearing plate, respectively. A swing link 49 is pivotally supported by the linear motion shaft and the oscillation shaft 45 in a manner swingable about the oscillation shaft 45.

The toggle mechanism 40 configured as described above controls the rotation of the servomotor 41 by a control means (not shown) by a start signal output from the resolver 29 shown in FIG. 1. When the crankshaft 42 is rotated by the servomotor 41, the eccentric rotation of the eccentric shaft portion causes the connecting rod to move up and down, and the vertical movement of the connecting rod causes the oscillating link 47 to pivot about the oscillation base shaft 46 and the swing link 49 to swing about the oscillation shaft 45 on an oscillating trajectory. This causes the upstream actuating rod 25 and the downstream actuating rod 26 to advance and retreat via the linear motion shaft and the bearing plates.

Next, as shown in FIG. 3, at the processing position 30A for the trimming process, the core punch 33 of the trimming tool 31B is attached to the upper die set 7 (see FIG. 1). Knockouts 35A are provided opposing each other below the core punch 33. The knockouts 35A move up and down via cams (not shown) provided to the auxiliary drive shaft 13 (see FIG. 1). The die holder 15A is attached to the lower base 14 (see FIG. 1) on the bolster 8 (see FIG. 1). The die holder 15A is formed so that it can slide to guide the actuation rod 25 horizontally and guide the knockouts 35A in the up-and-down direction. The core punch 33 is movable to be positioned inside the workpiece W, which is arranged below the core punch 33. The workpiece W is transferred by the fingers (not shown) and then positioned by the core punch 33 and the knockouts 35A at the lower end position shown in FIG. 3. The term "below" above corresponds to the "first direction" of the present invention. The term "second direction" above is orthogonal to the "first direction" along the horizontal direction.

As shown in FIG. 3, tool stands 36A and 36B are fixed to the actuation rod 25 by bolts (not shown) at positions in contact with outer side faces of the workpiece W for the trimming process. The tool stands 36A and 36B are each formed in a flat shape so that outer side faces of the workpiece W can be pressed by surfaces of the tool stands 36A and 36B, and function as workpiece guides for the outer side faces of the workpiece W.

The trimming tools 31A and 31B are fastened to the tool stands 36A and 36B at opening side edges of the workpiece W by bolts (not shown), respectively. The trimming tools 31A and 31B are each formed in a flat shape so that they can be in contact with the outer side faces of the workpiece W. Tool cutting edges 31$f$ and 31$g$ of the trimming tools 31A and 31B, respectively, are formed at each upper end corner of the outer side faces opposing the outer side wall of the workpiece W, respectively.

The core punch 33 is formed with core cutting edges 33$f$ and 33$g$ formed at bottom corners of outer side faces 33$b$ and 33$c$, which oppose the outer side faces of the workpiece W. Each opening of the workpiece W can be cut by the tool cutting edges 31$f$ and 31$g$ of the trimming tools 31A and 31B working in tandem with the core cutting edges 33$f$ and 33$g$ of the core punch 33. The trimming tools 31A and 31B include discharge holes 31$j$ and 31$k$, respectively, for discharging chips of the trimmed workpiece W downward.

The core punch 33 has a narrower shape at a portion below the core cutting edges 33$f$ and 33$g$ (hereinafter this portion is referred to as "narrow portion 33A") than at the outer side faces 33$b$ and 33$c$. In other words, at the narrow portion 33A, the distance between the outer side face 33$d$ and the outer side face 33$e$ is smaller than the distance between the outer side face 33$b$ and the outer side face 33$c$. Therefore, gaps H1 and H2 are created between the narrow portion 33A of the core punch 33 and the inner side faces of the workpiece W. When an opening (front side face and rear side face in the transfer direction) of the workpiece W is trimmed, the core cutting edge 33$f$ of the core punch 33 and the tool cutting edge 31$f$ come into contact with each other. If, for example, the gaps H1 and H2 are present between the narrow portion 33A of the core punch 33 and the inner side faces of the workpiece W, the workpiece W may tilt, which may impair the shape quality after trimming. In particular, since the opening of the workpiece W is cut sequentially for each side face, if the workpiece W tilts when the opening of the workpiece W is trimmed, the height of the trimmed areas may become uneven.

The gaps H1 and H2 described above are gaps created in the transfer direction, but since gaps occur in the transfer orthogonal direction as well, the same problem occurs when the opening (both side faces in the transfer orthogonal direction) of the workpiece W is trimmed. However, the problem caused by the gaps in the transfer orthogonal direction can be solved by the same means as those for solving the problem caused by the gaps H1 and H2 in the transfer direction. Therefore, this specification will only describe the means for solving the problem caused by the gaps H1 and H2 in the transfer direction and will not describe the means for solving the problem caused by the gaps in the transfer orthogonal direction.

In an embodiment of the present invention, as a means to solve the problem caused by the gaps H1 and H2 in the transfer direction, damper mechanisms 100A and 100B are provided as holding parts to hold the inner side faces of the workpiece W. The damper mechanisms 100A and 100B are provided in the gaps H1 and H2 created between the narrow portion 33A of the core punch 33 and the inner side faces of the workpiece W, respectively.

In the embodiment of the present invention, the damper mechanism 100A is provided in the gap H1 and the damper mechanism 100B is provided in the gap H2. If trimming is to be performed on both the front and rear side faces in the transfer direction, it is preferable to provide the damper mechanisms 100A and 100B in both the gaps H1 and H2, respectively. However, since a damper mechanism need only be provided for the gap on the side to be trimmed, it is not essential to provide the damper mechanisms 100A and 100B in both the gaps H1 and H2, respectively. For example, if trimming is to be performed only on the rear side in the transfer direction (left side of FIG. 3), only the damper mechanism 100A may be provided in the gap H1, and if trimming is to be performed only on the front side in the transport direction (right side of FIG. 3), only the damper mechanism 100B may be provided in the gap H2.

Note that, the "narrow portion 33A" corresponds to the "body portion" of the present invention, the "core cutting edge 33f" corresponds to the "first cutting edge" of the present invention, and the "tool cutting edge 31f" corresponds to the "second cutting edge" of the present invention.

The damper mechanisms 100A and 100B include workpiece holding portions 110A and 110B serving as workpiece guides, and expansion members 120A and 120B, respectively. The workpiece holding portions 110A and 110B are provided in a pair opposing each inner side face of the workpiece W, and are made of a metal non-compressible material, such as iron. Before trimming, the workpiece holding portions 110A and 110B are flush with the outer side faces 33b and 33c or positioned closer to each inner side face of the workpiece W than the outer side faces 33b and 33c and, during trimming, are in contact with the inner side faces of the workpiece W. The workpiece holding portions 110A and 110B are preferably formed in a long flat shape that can press the opposing inner side faces of the workpiece W with their surfaces.

The "workpiece holding portion 110A" and the "workpiece holding portion 110B" correspond to the "first member" of the present invention, and the "expanding member 120A" and the "expanding member 120B" correspond to the "second member" of the present invention.

The core punch 33 will now be described again in detail. The core punch 33 includes the core cutting edges 33f and 33g formed on bottom corners of the outer side faces 33b and 33c, respectively. Further, an inverted convex part serving as the narrow portion 33A is formed at the bottom of the core punch 33. As shown in FIG. 3, the workpiece holding portions 110A and 110B each formed in a long flat shape are provided in each gap created between the side faces of the narrow portion 33A of the core punch 33 and the opposing inner side faces of the workpiece W.

The workpiece holding portions 110A and 110B extend in the up-down direction of the paper in FIG. 3 and each have a length that does not come into contact with the bottom wall of the opposing inner side faces of the workpiece W from the opening of the workpiece W to be trimmed.

The expanding members 120A and 120B function as elastic parts capable of elastic deformation and are, for example, coil springs. Further, the expanding members 120A and 120B are provided as connecting parts for connecting the narrow portion 33A of the core punch 33 and the workpiece holding portions 110A and 110B.

In the embodiment of the present invention, as shown in FIG. 3, the two expanding members 120A and 120B are provided for each workpiece holding portion 110A and 110B. However, the number of expanding members 120A and 120B is not limited to two, and any number of expanding members 120A and 120B that allows moderate elastic deformation while stably supporting each workpiece holding portion 110A and 110B may be provided.

The "moderate elastic deformation" described above need only be elastic deformation to the extent that contact between the tool cutting edges 31f and 31g and the core cutting edges 33f and 33g is not impaired. In other words, from the viewpoint of inhibiting tilting of the workpiece W during trimming, the contact surfaces of the workpiece holding portions 110A and 110B to be in contact with the inner side faces of the workpiece W (hereinafter simply referred to as "contact surfaces of the workpiece holding portions 110A and 110B") are preferably closer to the inner side faces of the workpiece W than the core cutting edges 33f and 33g before trimming. That is, a closer distance between the contact surfaces of the workpiece holding portions 110A and 110B to the inner side faces of the workpiece W than the distance between the core cutting edges 33f and 33g and the inner side faces of the workpiece W is preferable because the contact surfaces of the workpiece holding portions 110A and 110B come into contact with the cylindrical workpiece W before the core cutting edges 33f and 33g. However, during trimming, it is necessary to bring the tool cutting edges 31f and 31g into contact with the core cutting edges 33f and 33g. Therefore, the expanding members 120A and 120B need to deform elastically to the extent that they do not interfere with the contact between the tool cutting edges 31f and 31g and the core cutting edges 33f and 33g.

While it is preferable that the contact surfaces of the workpiece holding portions 110A and 110B be closer to the inner side faces of the workpiece W than the core cutting edges 33f and 33g, no limitation is intended. The tilting of the workpiece W during trimming can be suppressed even when the contact surfaces of the workpiece holding portions 110A and 110B and the core cutting edges 33f and 33g are flush. Therefore, in a case where the contact surfaces of the workpiece holding portions 110A and 110B and the core cutting edges 33f and 33g are flush, the same effect can be achieved as when the distance from the contact surfaces of the workpiece holding portions 110A and 110B to the inner side faces of the workpiece W is closer than the distance from the core cutting edges 33f and 33g to the inner side faces of the workpiece W.

The expanding members 120A and 120B are not limited to coil springs and may be any expanding or elastic object, such as springs or rubber. The width and size of the elastic members 120A and 120B can be changed as needed within the range of the effect of the invention.

In the embodiment of the present invention, the tool stands 36A and 36B are provided as workpiece guides that hold the outer side faces of the workpiece W described above, and the damper mechanisms 100A and 100B are provided as workpiece guides that hold the inner side faces of the workpiece W. When trimming the opening of the workpiece W, the tool stand 36A (or tool stand 36B) that functions as an outer side face workpiece guide and the damper mechanism 100A (or damper mechanism 100B) that functions as an inner side face workpiece guide come into contact with each side of the workpiece W and hold the workpiece W. In other words, the workpiece W can be stably fixed by the tool stand 36A (or tool stand 36B) and the damper mechanism 100A (or damper mechanism 100B).

The "damper mechanism 100A" and the "damper mechanism 100B" correspond to the "guide member" of the present invention.

(Workpiece Guide)

Figure 5:
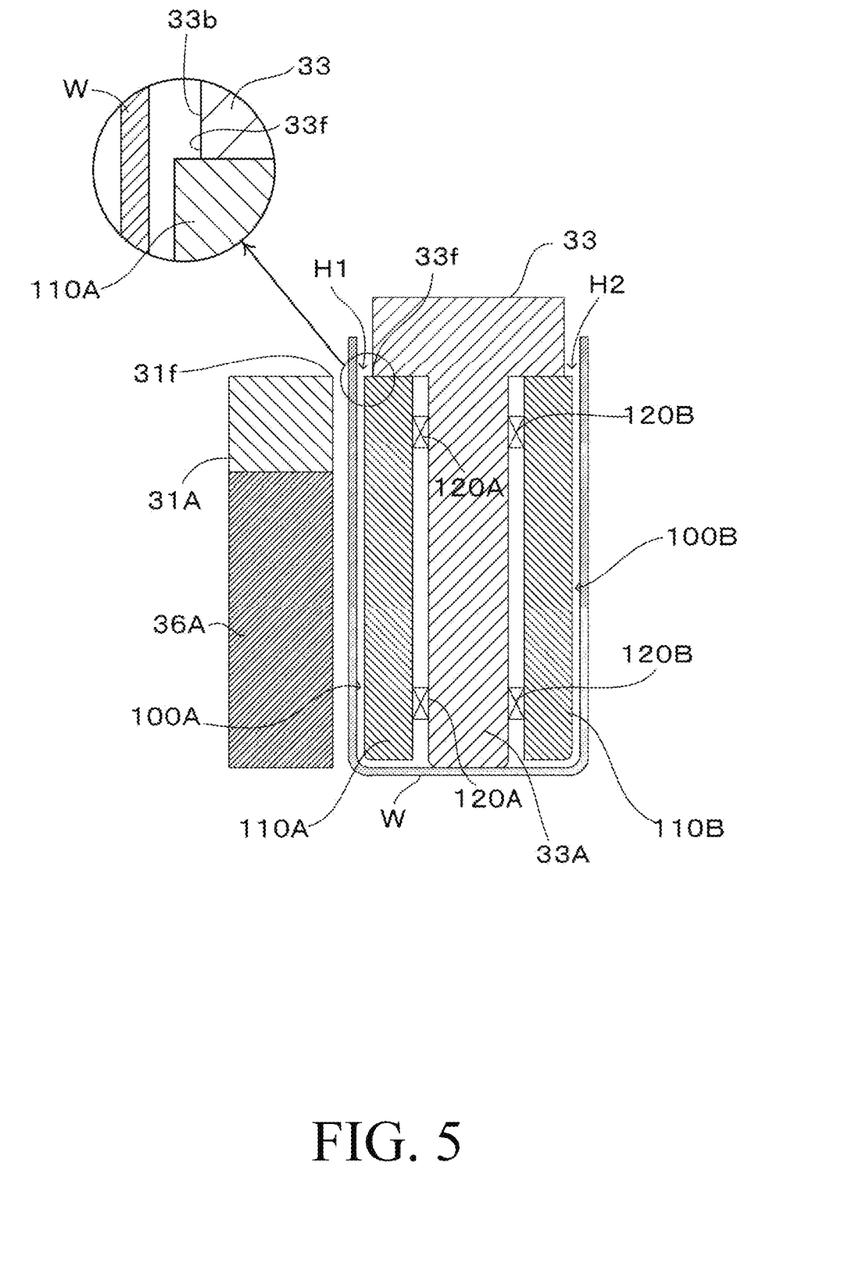
FIG. 5 is an explanatory view of an example of a trimming processing portion to be trimmed in a transfer direction, and is a schematic cross-sectional view illustrating a state before trimming.
Figure 6:
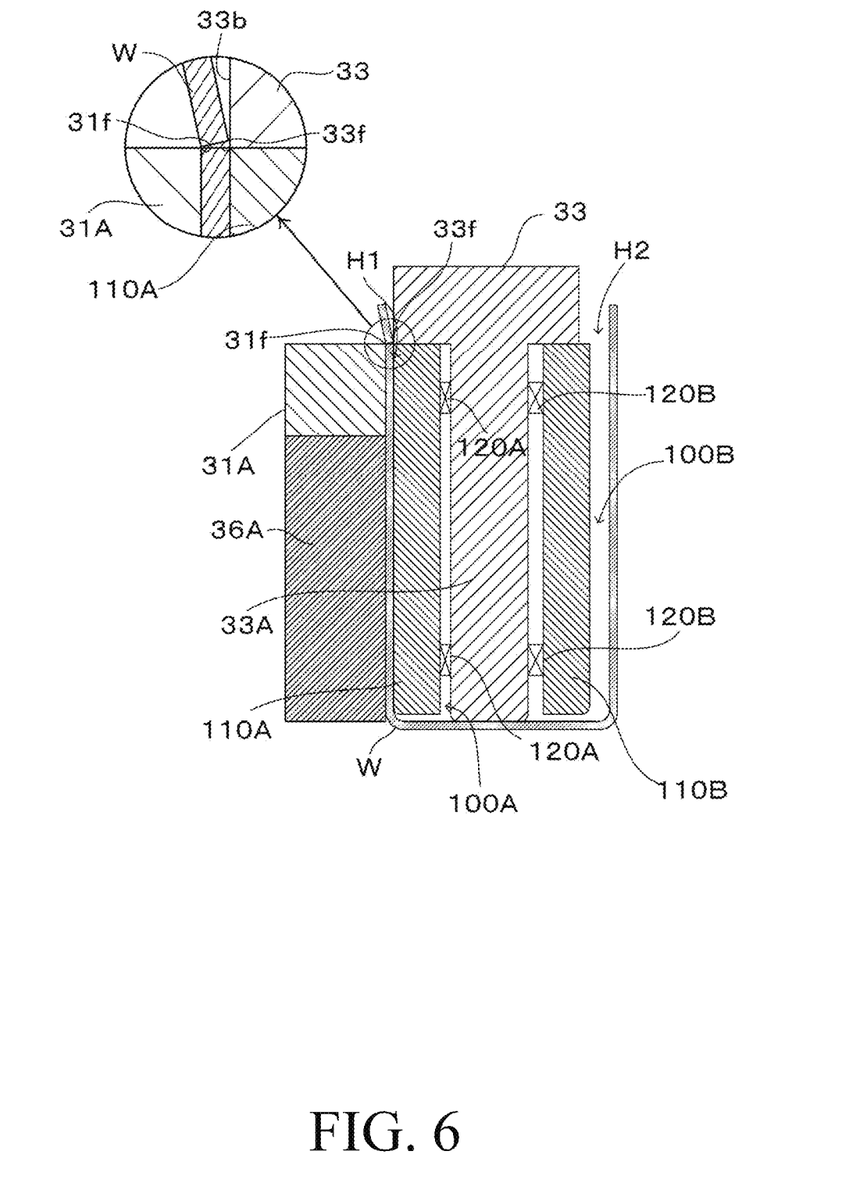
FIG. 6 is an explanatory view of an example of a trimming processing portion to be trimmed in a transfer direction, and is a schematic cross-sectional view illustrating a state during trimming.
Figure 7:
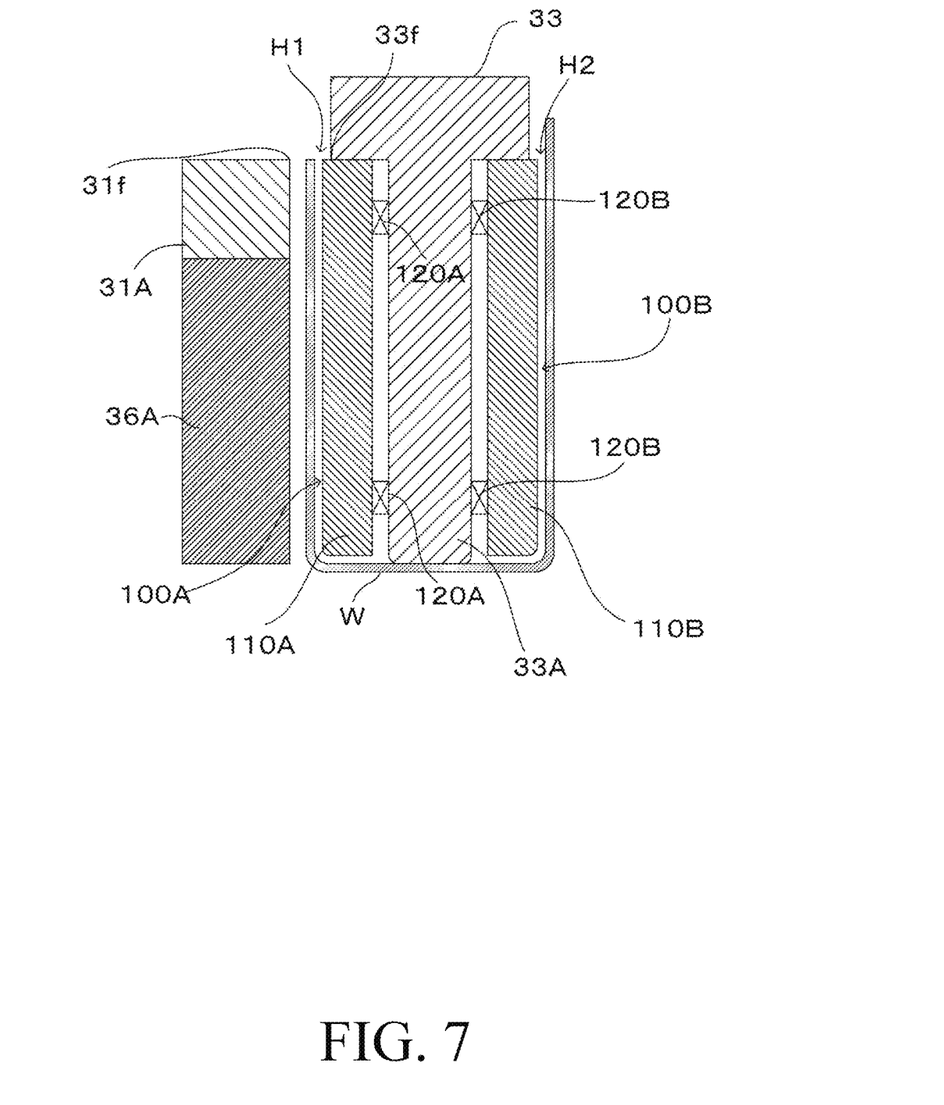
FIG. 7 is an explanatory view of an example of a trimming processing portion to be trimmed in a transfer direction, and is a schematic cross-sectional view illustrating a state after trimming.

Next, an example of operation of the tool stand 36A that functions as the outer side face workpiece guide and the damper mechanism 100A that functions as the inner side face workpiece guide will be described with reference to FIGS. 5 to 7. FIG. 5 is an explanatory view of an example of a trimming processing portion to be trimmed in a transfer direction, and is a schematic cross-sectional view illustrating a state before trimming. FIG. 6 is an explanatory view of an example of the trimming processing portion to be trimmed in the transfer direction, and is a cross-sectional view illustrating a state during trimming. FIG. 7 is an explanatory view of an example of the trimming processing portion to be trimmed in the transfer direction, and is a cross-sectional view illustrating a state after trimming. Note that, in FIGS. 5 to 7, illustration of the tool stand 36B is omitted. Further, FIGS. 5 and 6 also include an enlarged view of the part surrounded by the circle.

The direction in which the force received by the damper mechanism 100B from the tool stand 36B (see FIG. 3) acts is opposite to the direction in which the force received by the damper mechanism 100A from the tool stand 36A acts. Therefore, although the direction in which the damper mechanism 100B acts is opposite to the direction in which the damper mechanism 100A acts, the mode of action of the damper mechanism 100B is the same as the mode of action of the damper mechanism 100A. Therefore, an explanation of the mode of action of the damper mechanism 100B will not be provided.

As shown in FIG. 5, when the workpiece W is positioned at the lower end position described above, the tool stand 36A moves with the actuating rod 25 (see FIGS. 2 and 3) from the initial position shown in FIG. 5 toward the outer side face direction of the workpiece W (forward direction).

As described above, before the trimming process, i.e., when the tool stand 36A is at the initial position shown in FIG. 5, the contact surface of the workpiece holding portion 110A is preferably flush with the core cutting edge 33$f$ or closer to the inner side face of the workpiece W than the core cutting edge 33$f$. In FIG. 5, the contact surface of the workpiece holding portion 110A is closer to the inner side face of the workpiece W than the core cutting edge 33$f$. In other words, the contact surface of the workpiece holding portion 110A is located further on the left side of the paper in FIG. 5 than the core cutting edge 33$f$.

As shown in FIG. 6, after the tool stand 36A comes into contact with the outer side face of the workpiece W, when a force is further exerted against the outer side face of the workpiece W in the direction to the right of the paper in FIG. 6, the damper mechanism 100A and the workpiece W come into contact. Furthermore, when the tool stand 36A exerts a force toward the outer side face of the workpiece W, the expanding member 120A elastically deforms in the direction of contraction (toward the right side of the paper in FIG. 5), such that the core cutting edge 33$f$ of the core punch 33 and the inner side face of the workpiece W are brought into contact while stabilizing the posture of the workpiece W and suppressing the distortion of the workpiece W. The suppression of distortion of the workpiece W will be described below.

Furthermore, when the core cutting edge 33$f$ of the core punch 33 comes into contact with the inner side face of the workpiece W, the opening of the workpiece W is trimmed by the tool cutting edge 31$f$ of the trimming processing tool 31A and the core cutting edge 33$f$ of the core punch 33 working in tandem, as shown in the enlarged figure in FIG. 6.

Thus, the damper mechanism 100A is disposed in the gap H1 described above, and the contact surface of the workpiece holding portion 110A is in contact with the inner side face of the workpiece W, at least when the workpiece W is being trimmed. Further, since the damper mechanism 100A includes the expanding member 120A, when the opening of the workpiece W is trimmed, the posture of the workpiece W can also be stabilized without interfering with the tool cutting edge 31$f$ and the core cutting edge 33$f$ that are trimming the opening of the workpiece W. In other words, tilting of the workpiece W can be suppressed without interfering with the tool cutting edge 31$f$ and the core cutting edge 33$f$ that are trimming the opening of the workpiece W, and a decrease in shape quality after the workpiece W is trimmed can be suppressed. In particular, it is possible to suppress unevenness in the height of trimmed areas after the four sides of the workpiece W are trimmed in order, and to make the height after trimming uniform. Furthermore, even if, for example, only one of the four sides of the workpiece W is trimmed, distortion of the workpiece W can be suppressed. Therefore, it is possible to cut straight and suppress the cut surface from being sloped, for example. More specifically, for example, when a corner portion of the workpiece W is cut, as shown in FIG. 4(*d*), the corner portion is in contact with the cutting edges (tool cutting edge 31 and core cutting edge 33$f$) before other portions. Thus, if the damper mechanism 100A is not provided in the gap H1 described above (the same applies to the gap H2), the opening of the workpiece W will be distorted during the trimming strokes. The larger the length of the edge to be trimmed, the more pronounced the distortion becomes, and the more pronounced the decrease in quality becomes. Thus, providing a damper mechanism (damper mechanism 100A or damper mechanism 100B) in the gap (gap H1 or gap H2) on the side to be trimmed can suppress distortion of the workpiece W and reduce quality deterioration.

As described above, the workpiece holding portions 110A and 110B are made of an incompressible material, so that the expansion members 120A and 120B elastically deform when a force is exerted from the tool stands 36A and 36B against the workpiece W and the contact surfaces of the workpiece holding portions 110A and 100B are in contact with the inner sides of the workpiece W. Thus, compared to a configuration where the workpiece holding portions 110A and 110B are compressible members, the workpiece holding portions 110A and 110B can resist the force acting in the direction in which the workpiece W tilts. Moreover, since the expanding members 120A and 120B are disposed between the workpiece holding portions 110A and 110B and the narrow portion 33A, the trimming by the tool cutting edge 31$f$ and the core cutting edge 33$f$ is not inhibited. Therefore, the opening of the workpiece W can be suitably trimmed.

After the trimming process, when the tool stand 36A moves away from the outer side face direction of the workpiece W (retreats), the contact between the workpiece holding portion 110A and the workpiece W is first released. Then, as shown in FIG. 7, the tool stand 36A returns to its initial position.

In the embodiment of the present invention, the tool stand 36A moves while pressing the workpiece W, and the workpiece holding portion 110A holds the workpiece W so that it does not tilt. Thus, the workpiece W is held in a pinched state and its posture is stable. This prevents the workpiece W from tilting when the opening of the workpiece W is cut, i.e., when the trimming process is performed.

The damper mechanisms 100A and 100B described above are each integrally configured in the up-down direction, but no limitation is intended. For example, the damper mechanisms 100A and 100B may be divided into multiple parts in the up-down direction or/and in the transfer orthogonal direction (i.e., in a depth direction).

When trimming the opening of the workpiece W, it is not necessary to cause both of the trimming processing tools 31A and 31B to advance and retreat, and only the trimming processing tool on the side to be trimmed needs to advance and retreat.

The contact surface of the workpiece holding portion 110A is preferably in contact with the inner side face of the workpiece W, at least when the trimming is performed. Accordingly, the contact surface of the workpiece holding portion 110A may be in contact with the inner side face of the workpiece W even before the trimming process is performed, or the contact surface of the workpiece holding portion 110A may be in contact with the inner side face of the workpiece W when the trimming process is performed.

In the embodiments of the present invention, the damper mechanisms 100A and 100B composed of the workpiece holding portions 110A and 110B and the expanding members 120A and 120B serving as inner side face workpiece guides have been described, but no limitation is intended. The following is a description of a modified embodiment of the damper mechanisms 100A and 100B with reference to FIG. 8.

Modified Embodiments

Figure 8:
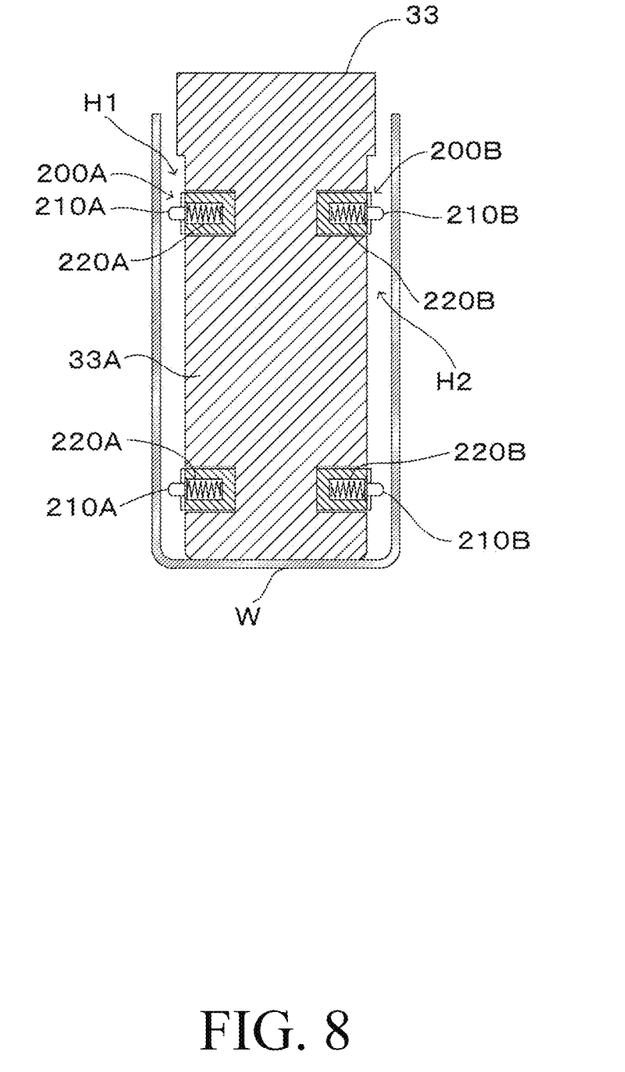
FIG. 8 is a schematic cross-sectional view showing an example of a modified embodiment of a trimming processing portion to be trimmed in a transfer direction, and shows the trimming processing portion when a plunger portion is attached to a core punch in place of a damper mechanism.

FIG. 8 is a schematic cross-sectional view showing an example of a modified embodiment of the trimming processing portion to be trimmed in the transfer direction, and shows the trimming processing portion when plunger portions 200A and 200B are attached to the core punch 33 in place of the damper mechanisms 100A and 100B. In the modified embodiment described below, the gaps H1 and H2, and the workpiece W are denoted by the same reference signs as in FIGS. 1 to 7, and explanations are omitted to the extent possible. Note that, the core punch 33A has a larger thickness in the transfer direction than the core punch 33 to allow the plunger portions 200A and 200B to be embedded, but no limitation is intended, and the core punch 33A may have any configuration provided that the plunger portions 200A and 200B can be attached to the core punch 33A.

The plunger portions 200A and 200B are holding members that press the workpiece W from the inside. For example, two plunger portions 200A are provided in the gap H1 side-by-side at a predetermined distance in the up-down direction. Two plunger portions 200B are provided in the gap H2 side-by-side at a predetermined distance in the up-down direction.

The plunger portion 200A includes a pin member 210A made of a non-compressible material and an elastic spring member 220A. The pin member 210A has the function of making contact with the inner side face of the workpiece W, similar to the workpiece holding portion 110A described above, and the spring member 220A has a similar function as the expanding member 120A described above. Similarly, the plunger portion 200B includes a pin member 210B made of a non-compressible material and an elastic spring member 220B. The pin member 210B has the function of making contact with the inner side face of the workpiece W, similar to the workpiece holding portion 110B described above, and the spring member 220B has a similar function to the expanding member 120B described above. Therefore, the plunger portions 200A and 200B can achieve a similar effect as when the damper mechanisms 100A and 100B described above are used. That is, when trimming the opening of the workpiece W, the posture of the workpiece W can be stabilized and distortion of the workpiece W can be suppressed without interfering with the trimming of the opening of the workpiece W, and unevenness of the heights of the trimmed portions can be suppressed. Further, since the pin members 210A and 210B are composed of an incompressible material and the spring members 220A and 220B are elastic, the opening of the workpiece W can be suitably trimmed.

In the modified embodiment shown in FIG. 8, two plunger portions 200A and 200B are arranged on each inner side of the workpiece W, respectively. However, no limitation is intended, and any configuration that enables moderate elastic deformation while stably holding each inner side of the workpiece W can be used.

For example, in a case where the distance between the core punch 33 or the inner side faces of the workpiece W is too small to place the damper mechanisms 100A and 100B and the plunger portions 200A and 200B, a rubber sheet or other elastic material may be attached to the core punch 33 (more specifically, the narrow portion 33A). With this configuration, it is possible to achieve a similar effect as the damper mechanisms 100A and 100B and the plunger portions 200A and 200B described above. However, since rubber and resin are likely to deteriorate, it may be difficult to precisely control the pressing pressure. On the other hand, it is possible to obtain shape quality of the workpiece cut section by controlling the function of the material through appropriate maintenance.

The damper mechanisms 100A and 100B and the plunger portions 200A and 200B described above may themselves be made of materials such as elastic or resilient springs or coil springs, or may be made of silicone or a sponge-like material, for example.

The embodiments of the invention are in all respects illustrative and should not be considered restrictive. The basic scope of the invention is indicated by the claims, not by the above embodiments, and is intended to include all modified embodiments within the meaning and scope equivalent to the claims.

REFERENCE NUMERALS

1 Transfer press
20 Trimming device
25, 26 Actuation rod
30A, 30B Trimming position
31A, 31B Trimming tool
31f, 31g Tool cutting edge
33 Core punch
33f, 33g Core cutting edge
36A, 36B Tool stand
100A, 100B Damper mechanism
110A, 110B Workpiece holding portion
120A, 120B Expanding member
200 Plunger portion
210A, 210B Pin member
220A, 220B Spring member
W Workpiece

What is claimed is:

1. A trimming device comprising:

a first trimming member including a first cutting edge and a body portion, the first trimming member being movable in a first direction and disposable inside a cylindrical workpiece;

a second trimming member including a second cutting edge, and being disposed such that a side portion of the cylindrical workpiece is between the first cutting edge and the second cutting edge; and a moving mechanism connected to at least one of the first trimming member or the second trimming member, and configured to move at least one of the first trimming member or the second trimming member in a second direction orthogonal to the first direction, wherein the trimming device moves at least one of the first trimming member or the second trimming member in the second direction to trim an opening edge of the cylindrical workpiece with the first cutting edge and the second cutting edge, wherein the opening edge of the cylindrical workpiece is located between the first cutting edge and the second cutting edge, the trimming device is configured such that:

in the state where the first trimming member is disposed inside the cylindrical workpiece, a first gap is created between the first cutting edge and the cylindrical workpiece in the second direction, which is a direction in which the first trimming member and the second trimming member approach each other; and when the at least one of the first trimming member or the second trimming member is moved in the second direction and the first cutting edge and the second cutting edge trim the opening edge of the cylindrical workpiece, a second gap is created between the body portion and the cylindrical workpiece in the second direction, wherein the second gap is located between the body portion and the opening edge which is being trimmed by the first cutting edge and the second cutting edge, and the trimming device further includes a guide member disposed in the second gap, the guide member being configured to:

suppress tilting of the cylindrical workpiece when the opening edge of the cylindrical workpiece is at least trimmed by the first cutting edge and the second cutting edge by being disposed in the second gap in contact with the cylindrical workpiece; and elastically deform when subject to a force in the second direction.

2. The trimming device as claimed in claim 1, wherein the guide member is provided at least at a first position and a second position at a predetermined interval in the first direction.

3. The trimming device as claimed in claim 1, wherein the guide member is provided extending in the first direction.

4. A transfer press comprising the trimming device described in any one of claims 1 to 3.

* * * * *